United States Patent
Prihoda et al.

(10) Patent No.: US 6,789,195 B1
(45) Date of Patent: Sep. 7, 2004

(54) SECURE DATA PROCESSING METHOD

(75) Inventors: Heinz Prihoda, Nuremberg (DE);
Volker Schmidt, Erlangen (DE);
Werner Striebel, Lauf (DE); Michael Becker, Pfedelbach (DE); Gregor De Lijzer, Vienna (AT)

(73) Assignee: Siemens Aktiengesellschaft, Münich (DE)

( * ) Notice: Subject to any disclaimer, the term of this patent is extended or adjusted under 35 U.S.C. 154(b) by 857 days.

(21) Appl. No.: 09/589,336

(22) Filed: Jun. 7, 2000

(30) Foreign Application Priority Data

Jun. 7, 1999 (DE) ......................................... 199 25 910

(51) Int. Cl.[7] ................................................. G06F 1/24
(52) U.S. Cl. ...................... 713/182; 713/155; 713/168; 713/189; 713/193; 713/200; 713/201
(58) Field of Search ................................. 713/182, 155, 713/168, 189, 193, 200, 201

(56) References Cited

U.S. PATENT DOCUMENTS

| | | | |
|---|---|---|---|
| 5,361,359 A | | 11/1994 | Tajalli et al. |
| 5,557,765 A | * | 9/1996 | Lipner et al. ............... 380/286 |
| 5,583,933 A | * | 12/1996 | Mark ..................... 379/357.04 |
| 5,606,610 A | | 2/1997 | Johansson |
| 5,745,555 A | * | 4/1998 | Mark ..................... 379/93.03 |
| 5,799,086 A | * | 8/1998 | Sudia .......................... 705/76 |
| 5,838,792 A | * | 11/1998 | Ganesan .................... 380/282 |

FOREIGN PATENT DOCUMENTS

WO   WO 97/49211   12/1997

OTHER PUBLICATIONS

"Ein Sicherheitskonzept fur Klinische Anwendungs-syteme"—J. Michaelis, G. Hommel and S. Wellek; Europaische Perspektiven der Medizinischen Informatik, Biometrie und Epidemiologie; pp. 371–374; 1993.
"Access Control: Principles and Practice"—Ravi S. Sandhu and Pierangela Samarati; IEEE Communications Magazine; pp. 40–48; Sep. 1994.
"Security, Payment and Privacy for Network Commerce"—Clifford Neuman; IEEE Journal on Selected Areas in Communciations;vol. 13, No. 8, pp. 1523–1531; Oct. 1995.
"Datensicherheit im Internet: Prinzipien, Moglichkeiten und grenzen"—Von Rumen Stainov; Heft, pp. 32–40; 1996.
"Datenschutz und Datensicherheit in Offentichen Netzen im Gesundheitswesen"—K. Pommerening and B. Blondel; Forum der Medizin–Informatik, pp. 10–13; 1997.

* cited by examiner

Primary Examiner—Thomas R. Peeso
(74) Attorney, Agent, or Firm—Schiff Hardin LLP

(57) ABSTRACT

A method for the processing of data which are stored in at least one database in at least partially encrypted form, in which case the data can be read by a user communicating with the database via a communications link and, if necessary, new data can be stored, in which case the data are decrypted and/or encrypted exclusively by the user using a key which is stored in a central further database and can be transmitted exclusively to the authorized user.

20 Claims, 2 Drawing Sheets

SECURE DATA PROCESSING METHOD

BACKGROUND OF THE INVENTION

1. Field of the Invention

The present invention relates to a method for the processing of data which are stored in at least one database in at least partially encrypted form, in which case the data can be read by a user communicating with the database via a communications link and in which, if necessary, new data can be stored.

2. Description of the Prior Art

Data to be stored in a database are ever more frequently composed of non-critical parts, whose contents require no special secrecy, and critical data which, if at all, may be accessed only by a limited range of users. In order to store such critical data with protected access, it is known for the data to be stored in encrypted form. Cryptographic methods (for example DES, RAS, IDEA) are used for this purpose, and use symmetrical or asymmetrical keys in order to encrypt the data. In known methods for secure communication, the data are encrypted while being transmitted (line encryption) between the client and the server, the data then exist in unencrypted form once again at the central point, and are generally stored in unencrypted form in a central database. With these methods, there is a security gap, since anyone who has administrative access to the central database can read all the data. A solution to this problem is known, in which the data are encrypted on the central server and are stored in the database in encrypted form. In this case as well, there is still a security gap when accesses are made to the central point. Since they exist on the server in plaintext at one point in time, the data can be copied before or during the encryption process. One method of the type mentioned initially can be used, for example, in the area of medicine or by doctors, in the course of which, for example, a number of doctors, as users, have access to the patient data stored in a central database.

Sandhu, R. et al, Access control: Principles and practise, IEEE Communications Magazine, September 1994, pages 40–48, describes the access control provided via ACL. Access Control Lists are used to control who may access objects, and in what role. The rights to do so are stored in databases, and that an authorization database must be checked before access by the user.

Neumann, C., Security, Payment and Privacy for Network Commerce, IEEE J. on select. A. in Comm., Vol 13, No. 8, October 1995, pages 1523–1531, describes a protocol, in the description relating to FIG. 1 on page 1525, in which a client would like to communicate with a service provider. To do this, a session key is agreed via a server, and is used by the client to gain access to the provider.

SUMMARY OF THE INVENTION

An object of the present invention is to provide a method which can allow secure data transmission and storage in a system in which a number of users have access to a central database.

In order to solve this problem, in a method according to the invention of the type initially described, the data are decrypted and/or encrypted exclusively at the user end using a key which is stored in a central further database and can be transmitted exclusively to the authorized user.

The method according to the invention thus no longer involves the data being encrypted and decrypted at the central server end itself, and no longer uses line encryption, rather, by contrast, it provides for this to be done exclusively at the user end. In this case, the data are available in unencrypted form only at the doctor's end (that is to say at the client), and the data are encrypted at the doctor's end even before they are transmitted to the central database (server). This makes attacks on the central data storage point, which is at risk, very difficult, in particular even attacks by the system administration. Thus, in the method according to the invention, only encrypted data, or only encrypted data parts which contain critical information and, as a consequence, need to be especially protected, are transmitted via the communications link, which can be tapped. Non-critical data may also be transmitted, of course, in unencrypted form. Protection against unauthorized data access is furthermore ensured in that a special key is required for encryption and/or decryption, which key is allocated exclusively to authorized users from a central further database. This key is thus passed only to the users who are authorized for access, for example only to doctors who are authorized for access.

The data may be composed of data parts and association data which identify a person or an object and describe a person or an object, in which case the identifying data parts are stored in a first database and the descriptive data parts are stored in a second database, in each case with an association data item. Those data parts which are stored in the other database can be found using the identically formed association data, and in which case at least the association data item of the identifying data parts and, if required, the descriptive data parts are encrypted, and can be decrypted using the transmitted key. Two separate databases are thus used in this case and preferably, but not necessarily, do not communicate with one another. The databases are object-oriented databases which, for example, contain patient data in the form of patient-specific files. At least the critical data are encrypted, non-critical data need not necessarily be stored in encrypted form in the second database. If, for example, the data are medically relevant patient data, then data which either refer to a person or contain other critical information are stored, like the association data item, in encrypted form in the second database which contains the descriptive data parts. Non-critical data, to which, for example, unlimited access may be allowed in the course of epidemiological investigations, are stored in unencrypted form in this database. On the other hand, the demographic patient data are stored in the first database, and the encrypted association data item is stored as an encrypted reference. Since the data which identify the patients are stored in unencrypted form in the first database, it is possible to search for a patient in this database and to determine the encrypted association data item while, however, access to the second database with the descriptive data is possible only if the association data item can be decrypted so that it is possible to search for the association data item, which is stored in unencrypted form in the second database, and to call up the data. Furthermore, it is possible to provide a further encryption stage, namely when the first and the second database communicate with one another. In a case such as this, the relevant data can be protected using a method such as described in PCT Application WO 97/49211 or U.S. Pat. No. 5,606,610.

Furthermore, according to the invention, it is possible to provide for the descriptive data parts to be stored together with association data in a group-specific second database, which is associated with a specific user group, which includes personnel who may have authorized access to the stored data. User groups are thus formed, with each user group being assigned a group-specific second database. All group members have authorized access to this database. Such a group may be, for example, a group formed by a number of doctors who have a group practice. All of them have access to a common patient list and, since they are authorized to have the key or can be authorized to be given the key, they can call up the appropriate data without having to obtain the patient's consent. The composition of the respective groups may change and, of course, it is also possible for one doctor to belong to a number of groups, in the same way that it is also possible, of course, for one patient to have a file in a number of group databases, for example in a first group involving a number of family doctors, and in a second group which comprises, for example, a number of internists. It is likewise also possible, if necessary, to inhibit access by the patient to his data for a specific group, and to enable it if required.

The identifying data parts together with the association data may, according to the invention, be stored in a first database which is common to all users, or to all users in a group. This represents an information database which each user has to be able to select in order to obtain the relevant association data at all. This is an easy way to create the capability to check the authorization of the requesting user. Authorization data which are used to authorize access by the user to the data in the first database may thus specifically be checked in a further database which contains authorization data and is effectively connected upstream of the first database, in which case access to data in the first database is enabled or inhibited depending on the result of the check.

The key transmitted to the user may be transmitted to him or her only once, and it is then permanently kept by the authorized user. However, it has been found to be expedient for the relevant key to be transmitted with each request to the user since, of course, the key may also change over the course of time. In order to ensure that the key is not read without authorization in the course of this transmission process, which would mean that an unauthorized third party could access the data, in an embodiment of the invention the key which is transmitted to the user is encrypted using a user-related public key (IndPubKey), and is decrypted by the user using a user-related private key (IndPrivKey). This means that each authorized user, that is to say the doctor in a group practice for example, has a private key. The key required for encryption and decryption is sent to him or her in encrypted form, and the asymmetric public key is used for encryption. The doctor can now decrypt this using his or her private key, and call up the relevant data using the key which then exists in unencrypted form.

According to the invention, the key which is transmitted to the user is a private group key (DomPrivKey) which is assigned to a specific user group, and by means of which a public group key (DomPubKey), by means of which the association data item and, if required, further data parts are encrypted, is decrypted, or is encrypted for the storage of data. The transmitted key is thus also an asymmetric private key, by means of which the public matching key, using which the relevant data parts are encrypted, can be opened. Thus, in this case, two different asymmetric key pairs are used.

As an alternative to this, it is possible to provide for the association data item to be encrypted using a public file key (FilePubKey) and for the encrypted association data item to be assigned a private file key (FilePrivKey), by means of which the association data item encrypted using the public file key can be encrypted and decrypted. The private file key is encrypted and decrypted using the public group key (DomPubKey). Thus, in this case, the asymmetric file key pair is also provided, by means of which the data are encrypted and decrypted, with the private file key once again being encrypted using the public group key, which the doctor can open by decryption using the private group key that he possesses. Thus, in this variant of the method, three asymmetric key pairs are used. Alternatively, the association data item may also be encrypted using a symmetrical file key (FileSymKey) which, for its part, is encrypted and decrypted using the public group key (DomPubKey).

In order in addition to allow the person whose data are stored to have access to this data, the invention can provide for this person as well to have the private file key (FilePrivKey) by means of which, as described, the association data item and, if required, further data parts encrypted, so this person can access the personal data and, if required, can edit the data and can store it in encrypted form. This is expedient, for example, if such a person receives medically relevant data at home which, in this way, can then be entered in the personal data file. Such data may be, for example, blood pressure values or the insulin content or the like, i.e., data which the patient can receive at home. This avoids a tedious visit to the doctor.

According to the invention, the encrypted data parts to be stored in the second database are encrypted using the public group key (DomPubKey) or the public file key (FilePubKey). The decryption process takes place using the respective asymmetric private key. This can result in a problem if the data which identify somebody are encrypted using a public key and such data are also stored in the second database, since this key is known. If an unauthorized third party is searching for data relating to a specific person, he can now encrypt the identification data known to him, for example the surname and the first name of the person, using the known public key, and can search for the patient in the second database, using the string which results from this process. The same access possibility can occur in the opposite direction if the association data stored in unencrypted form in the second database are encrypted systematically using public keys, and the first database is then searched for the encrypted association data. In order to overcome this, an expedient development of the invention provides that the data parts and/or association data to be encrypted are expanded by having random data added to them before encryption, and the expanded data are encrypted using the public group key (DomPubKey) or the public file key (FilePubKey). Since the unauthorized third party does not know what random data have been attached, the third party cannot produce a string which will allow searching in whatever database it might be. This further improves the security of the method. During reading, the attached random data are automatically identified as such, and are ignored.

As described, it may also be necessary to encrypt descriptive data parts. Since this may occasionally involve large quantities of data, encryption of such data using an asymmetric key has been found to be very time-consuming. In order to overcome this, according to the invention, that at least those data parts which are to be encrypted and, if required, expanded, are initially encrypted using a symmetrical data key (DatSymKey) which is encrypted using the public group key (DomPubKey) or the public file key (FilePubKey). This encrypted symmetrical data key is stored together with the data parts and can be decrypted in a corresponding manner. The encryption process with a symmetric key takes place about 2000 times faster than the encryption process using an asymmetric key.

According to the invention, the keys may be produced by a central production point, if required a group's own central production point. For example, this may be a trust center or, if the group has its own central production point, a group member may be defined as the "production point", and he or she is given the appropriate authorization for key production and has the appropriate production machines installed in his or her area. As an alternative to this, the keys can be produced by the user himself or herself.

According to the invention, those data parts which are to be stored in the second database and are to be encrypted may be assigned further data, which define an encryption machine used for encryption and are encrypted together. Various encryption machines, which each operate with specific key lengths or encrypt only specific parts of the data, can be installed in the user's area. By means of the associated further data, information relating to this is stored, so that the algorithm which carries out the user-end data processing can identify the encryption machine which it must access, at least for decryption.

According to the invention, each person or each object within a user group may be assigned only one association data item. In order to notify changes within the stored data, and to make them comprehensible, according to the invention when new data are being stored, the already existing data are stored as a data item version so that version definition is carried out whenever a storage process takes place. In order furthermore to make it clear who has carried out any change or else has called up data, according to the invention an identification data item for the calling or storing user is attached to each data item which is called up and/or newly stored, i.e., a user signature is attached.

It has been found to be expedient to use an encryption table in the course of the encryption process, this encryption table being provided at the user end and containing information about those data sections which are to be encrypted, the data changes or data expansions that need to be carried out in order to maintain the data integrity, and the encryption itself. Such an encryption table, which, for example, applies to a specific user group, defines what parts of the patient data must be encrypted, for example the surname or the first name, with which algorithms and which key lengths the data must be encrypted, and with which precise keys the data parts and association data must be encrypted. Furthermore, this determines what dummy information must be entered in the data so that the data integrity is ensured in accordance with the predetermined data model, a suitable example of which is an HL7 model. To do this, a cryptohash table, which is known, can be used. The use of the encryption table makes the work simple, while any changes in the encryption mode can equally be carried out in a simple way, by editing the table. Changes in the algorithm, in the key length and the like can thus be carried out without any problems. Since each group preferably has its own encryption table, different encryption concepts are also possible between different groups.

According to a further version of the invention, the encryption table is stored in the first database and to be transmitted to the user when an authorized access is made to the data in the first database, which allows any changes to be carried out centrally on the first database. Alternatively, the encryption table can also be produced at the user end.

DESCRIPTION OF THE PREFERRED EMBODIMENTS

Figure 1:
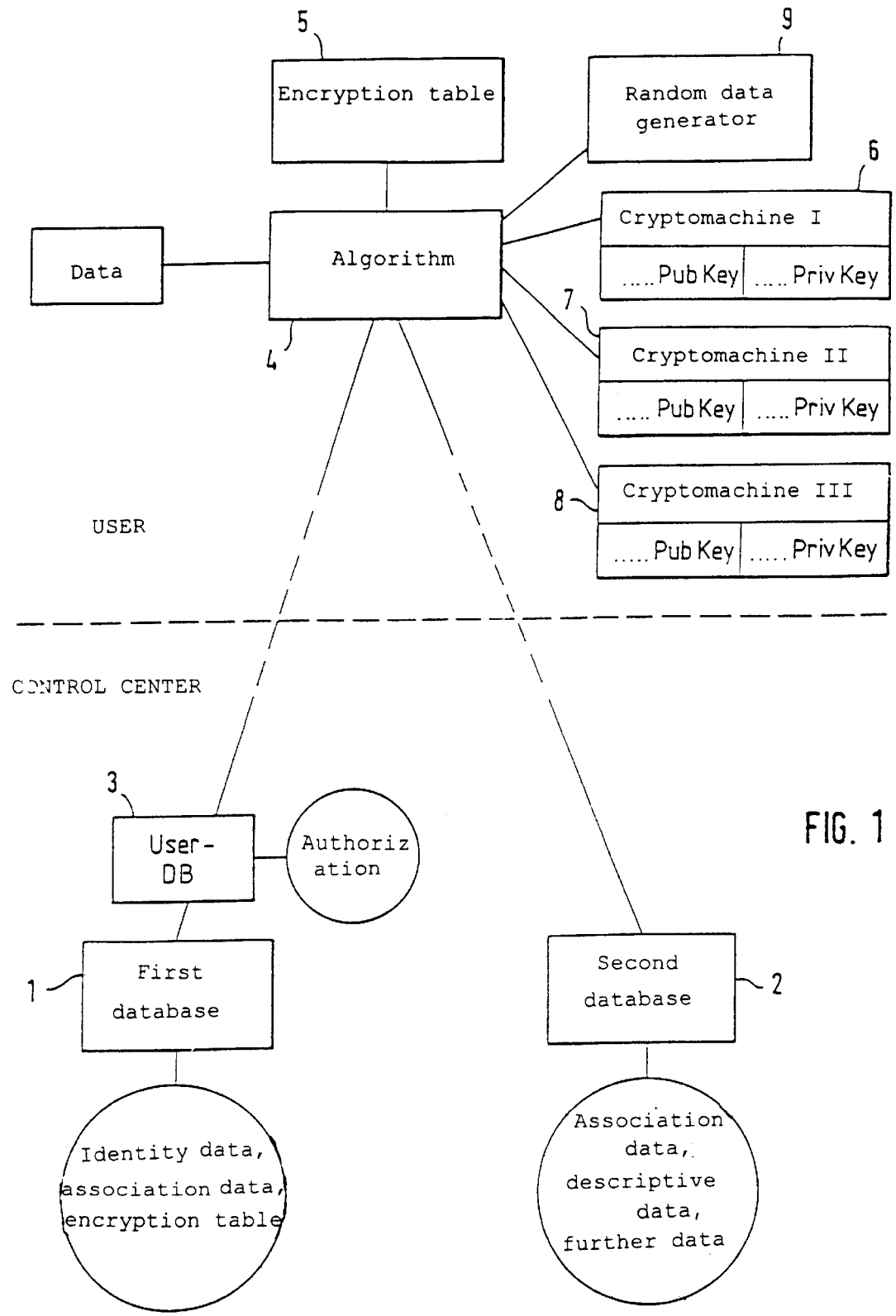
FIG. 1 is a diagram to illustrate the method according to the invention, and the relevant components required for this purpose.

As FIG. 1 shows, a distinction is made between the user end and the control center end. A first database 1 and a second database 2 are provided at the control center end. The identification data for a person or an object as well as association data which are specific to the respective person or the object, and an encryption table, are stored in the first database. The association data are stored in unencrypted form in the second database 2, and, if required, in at least partially encrypted form, descriptive personal data as well as further data which indicate, for example, the cryptomachine uses for encryption.

A third database (User-DB) 3 is upstream of the first database and stores authorization data that are used to check whether a user requesting access to data in the first database is authorized to do so. Provided the user is authorized to do so, the user has access to the respective databases via communication links which may be configured in any desired form (cable-based or wireless). At the user end, an algorithm 4 is provided, via which the encryption and decryption of the data are carried out. Furthermore, an encryption table 5 is provided, which, in the exemplary embodiment, is transmitted whenever there is any communication with the first database 1. This encryption table contains all the information required for encryption and decryption, for example what parts of a patient's file must be encrypted, with which algorithms and which key lengths, and with which keys and the like. Furthermore, three cryptomachines 6, 7, 8 are provided in the illustrated example, by means of which the encryption and decryption are carried out, which is done by means of machine-specific public keys ( . . . PubKey) or private keys ( . . . PrivKey), in which case the public keys for the crypto-machines 6, 7 and 8 may be identical to the private keys.

If a user, for example a doctor, now wishes to access data in the first database, for example because new data need to be entered after examination of a patient, then the doctor first initiates an authorization request and sends his or her authorization data, which are checked in the third database 3. Provided the doctor is authorized, he or she can communicate with the first database 1. There, the doctor can search for unencrypted personal identity data relating to the patient, and can call up such data. An encrypted association data item is attached to such identity data and provides, in decrypted form, the reference to the respective descriptive personal data in the second database. By means of various keys, which will be described below, the doctor at the user end can now decrypt the association data and, by means of the unencrypted association data, can then search for such data in the second database, where the doctor can call up the data, which may be partially encrypted. When such data have been decrypted, the doctor can then make appropriate changes or the like. Any changes are defined as versions and are provided with a user identifier, for example in the form of a signature. If it is now intended to install the edited data, then the respective encryption steps are read by the algorithm 4 from the encryption table 5, and are carried out by the appropriate crypto-machine. In FIG. 1 a random data generator 9 is also provided, by means of which random data are generated. The random data, for example, are attached as dummy information to association data stored in encrypted form in the first database, and are encrypted at the same time in order to avoid the use of public keys, which may possibly be available to unauthorized third parties, to encrypt the association data, which are present in unencrypted form in the second database 2. The association data would provide an unauthorized third party with various strings, with which such a person could then search the first database, and could thus create a link between personal data in the first and second databases.

Figure 2:
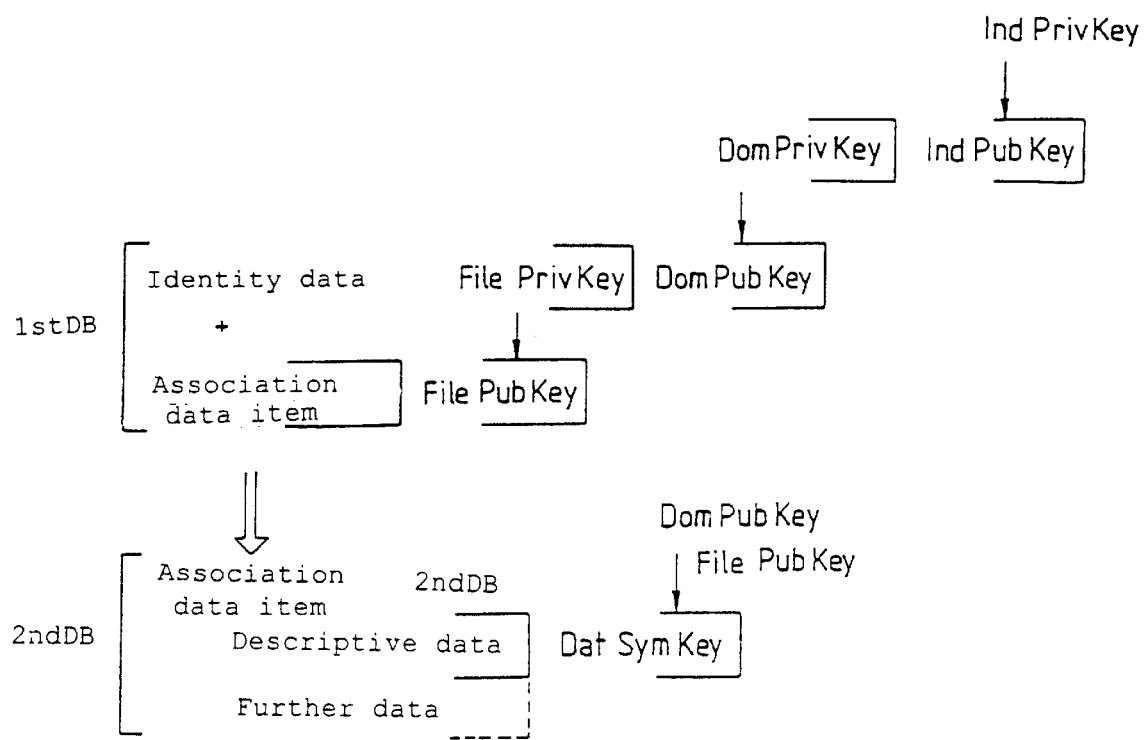
FIG. 2 is a diagram to illustrate one encryption option in the context of inventive method.

FIG. 2 shows an example of how data can be encrypted and decrypted. As described, the identity data are stored in unencrypted form in the first database, and the association data item relating to the descriptive data is stored in encrypted form in the second database. The association data item is first encrypted using a public file key FilePubKey (File Public Key). A private file key FilePrivKey (File Private Key) is attached to this and is in turn encrypted using a public group key DomPubKey (Domain Public Key). This public group key is associated with a group of users who are all authorized to be able to access data in the first database. This group may be, for example, a group of doctors. The private group key DomPrivKey (Domain Private Key) is attached to the public group keys DomPubKey, and allows the encrypted public group key DomPubKey to be decrypted. The private domain key DomPrivKey is in turn encrypted using a user-related public IndPubKey (Individual Public Key).

This can in turn be opened using the user-related private key IndPrivKey (Individual Private Key). This private key IndPrivKey is the individual doctor's key which the doctor has, for example, stored on a smart card. In the present case, there are a total of three asymmetric key pairs which are used for encryption, and for decryption as well. It should be mentioned that the encryption can also be carried out using only two asymmetric key pairs, namely the group key pair DomPubKey and DomPrivKey and the user-related key pair IndPubKey and IndPrivKey. However, if encryption is carried out using three key pairs, then it is possible to give the patient the right of access to his or her private data, by giving the patient the private file key FilePrivKey. Using this, the patient can directly open the public file key FilePubKey used for encryption of the association data item and, by means of the association data item (which is then unencrypted) as a reference, can access his data in the second database, and, if required, can edit them or add to them.

All the keys are passed to the user once authorization has been carried out via the communications link. The decryption and the encryption are carried out exclusively at the user end.

If the association data item has now been decrypted at the user end, then it is possible to search for the unencrypted association data item in the second database. The descriptive data, for example for the patient, are stored under the association data item, possibly as well as further data, which include more detailed information relating to the encryption method by means of which the descriptive data are encrypted. Both the descriptive data and, possibly, the further data may be encrypted by means of a symmetrical data key DatSymKey (Data Symmetrical Key), if large quantities of data are involved. The use of a symmetrical data key allows the encryption process to be carried out much more quickly than if this were done using an asymmetric key. The symmetrical data key is encrypted by means of a public key, in the illustrated example either the public group key DomPubKey or the public file key FilePubKey. In the situation where the patient is intended to have access directly to his file, the public file key would have to be used in order to allow the patient to decrypt the symmetrical data key DatSymKey.

Instead of the asymmetric file key pair FilePubKey and FilePrivKey, a symmetrical file key FileSymKey may also be used, which is encrypted and decrypted using the public group key DomPubKey.

Furthermore, it is possible to store the identity data in encrypted form in the second database as well, in which case the same key as used for encryption and decryption of the descriptive data can be used for encryption and decryption. Storage of the identifying data in the second database as well allows personal or object-specific changes, for example a change to a name, to be carried out in a simple way directly in the "File" so that this always results in a correct and transparent personal or object association or match between the data stored in the two databases.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for processing data, comprising the steps of:

storing data in at least one database with at least a portion of said data being stored in said database in encrypted form;

allowing communication with said database by a user via a communication link to read said data stored in said database and, if necessary, to enter additional data into said database;

storing a key, for decrypting and encrypting said data, in a central database separate from said data base;

transmitting said key from said central database exclusively to an authorized user who is authorized to communicate with said database, for use by said authorized user in at least one of encrypting and decrypting said data in said database dividing said database into a first data base and a second data base;

dividing said data into first data parts respectively identifying subjects, selected from the group consisting of persons and objects, as identified subject, and into second data parts respectively describing said subjects, as described subjects;

uniquely associating said identified subjects with said described subjects by respective association data items;

storing said first data parts in said first database with the respective association data items;

storing said second data parts and said second database with the respective association data items, identical to the respective association data items in said first database so that respective first and second data parts in said respective first and second databases can be found and associated by the respective identical association data items; and storing the respective association data items in said first database in encrypted form produced using said key, and optionally also storing the respective second data parts ins aid second database in encrypted form produced using said key, said association data items in encrypted form, and if present, said second data parts in encrypted form, comprising encrypted data, and said encrypted data being decrypted using said key transmitted to said authorized user.

2. A method as claimed in claim 1, further comprising the steps of:

encrypting said key which is transmitted to said authorized user using a user-related public key to produce an encrypted key; and said authorized user decrypting said encrypted key using a user-related private key.

3. A method as claimed in claim 2, further comprising the steps of:

assigning only one of said association data items to each subject within said group.

4. A method as claimed in claim 1, comprising designating said second database as a group-specific database for a specific user group comprising only personnel having authorized access to said second data parts, and storing said second data parts together with the respective association data items in said group-specific second database, and employing a dedicated encryption table, as said encryption table, for said specific user group.

5. A method as claimed in claim 1, further comprising the steps of:

designating said second database as a group-specific database for a specific user group comprising only personnel having authorized access to said second data parts; and storing said second data parts together with the respective association data items in said group-specific second database.

6. A method as claimed in claim 5, further comprising the step of:

making said first database accessible for all users, not limited to said specific user group.

7. A method as claimed in claim 5, further comprising the step of:

employing a public group key to encrypt said association data items to be stored in said first database, and optionally to encrypt said second data parts, to produce said encrypted data;

as said key transmitted to said authorized user, employing a private group key and assigning said private group key exclusively to said specific user group; and encrypting and subsequently decrypting said public group key using said private group key.

8. A method as claimed in claim 7, further comprising the steps of:

using a public file key to encrypt at least one of said association data items to be stored in said first database to produce an encrypted association data item;

assigning a further file key selected from the group consisting of a private file key and a symmetrical file key to said encrypted association data item with which said encrypted association data item is encrypted and decrypted; and encrypting and decrypting said further file key using said public group key.

9. A method as claimed in claim 8, wherein the first data part associated with said encrypted association data item identifies a person, and further comprising the step of:

making said private file key available to said person.

10. A method as claimed in claim 8, further comprising the step of:

also encrypting said second data parts using a key selected from the group consisting of said public group key and said public file key.

11. A method as claimed in claim 10, further comprising the steps of:

expanding at least one of said association data items to be stored in said first database and said second data parts by adding random data thereto before encryption to produce expanded data, and encrypting said expanded data using a key selected from the group consisting of said public group key and said public file key.

12. A method as claimed in claim 8, further comprising the steps of:

encrypting said second data part using a symmetrical data key; and encrypting and decrypting said symmetrical data key using a key selected from the group consisting of said public group key and said public file key.

13. A method as claimed in claim 12, further comprising the steps of:

producing all of said keys at a location selected from the group consisting of a central production location and a production location of said group and at a user location.

14. A method as claimed in claim 1, wherein said encrypted data includes said second data parts, and comprising the additional steps of:

assigning further data respectively to said second data parts, said further data defining an encryption machine; and using said encryption machine to encrypt said second data parts and said further data.

15. A method as claimed in claim 1, further comprising the steps of:

providing a further database containing authorization data identifying authorized users;

before allowing access to said first data base by a potential user, requiring said potential user to enter information which is checked in said further database against said authorization data to determine whether said potential user is an authorized user; and inhibiting access by said potential user to said first database if said potential user is not an authorized user.

16. A method as claimed in claim 1, further comprising the step of:

employing an encryption table for encrypting and decrypting said data;

storing said encryption table in said first database; and making said encryption table available only to an authorized user.

17. A method for processing data, comprising the steps of:

storing data in at least one database with at least a portion of said data being stored in said database in encrypted form;

allowing communication with said database by a user via a communication link to read said data stored in said database and, if necessary, to enter additional data into said database;

storing a key, for decrypting and encrypting said data, in a central database separate from said data base;

allowing storage of new data in said at least one database; and upon storage of said new data, assigning any existing data in said at least one database a version identifier.

18. A method for processing data, comprising the steps of:

storing data in at least one database with at least a portion of said data being stored in said database in encrypted form;

allowing communication with said database by a user via a communication link to read said data stored in said database and, if necessary, to enter additional data into said database;

storing a key, for decrypting and encrypting said data, in a central database separate from said data base;

wherein the step of allowing communication with said database includes allowing retrieval of said data in said database by said authorized user; and upon each retrieval of data from said database, attaching an identifier to said data which identifies the authorized user who retrieved said data.

19. A method for processing data, comprising the steps of:

storing data in at least one database with at least a portion of said data being stored in said database in encrypted form;

allowing communication with said database by a user via a communication link to read said data stored in said database and, if necessary, to enter additional data into said database;

storing a key, for decrypting and encrypting said data, in a central database separate from said data base; and employing an encryption table for encrypting and decrypting said data.

20. A method as claimed in claim 19, further comprising the step of:

producing said encryption table at a location of an authorized user.

* * * * *